(12) United States Patent
Zuercher et al.

(10) Patent No.: US 8,889,228 B2
(45) Date of Patent: Nov. 18, 2014

(54) NOISE-REDUCING EXTRUSION COATING COMPOSITIONS

(75) Inventors: Karl Zuercher, Samstagern (CH); Angels Domenech, La Selva Del Camp (ES)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/518,611

(22) PCT Filed: Nov. 29, 2010

(86) PCT No.: PCT/US2010/058204
§ 371 (c)(1),
(2), (4) Date: Jun. 22, 2012

(87) PCT Pub. No.: WO2011/081753
PCT Pub. Date: Jul. 7, 2011

(65) Prior Publication Data
US 2012/0258325 A1    Oct. 11, 2012

Related U.S. Application Data

(60) Provisional application No. 61/290,580, filed on Dec. 29, 2009.

(51) Int. Cl.
*B29K 23/00* (2006.01)
(Continued)

(52) U.S. Cl.
CPC .......... *C09D 123/06* (2013.01); *B29C 47/0021* (2013.01); *B29C 47/025* (2013.01); *B29C 47/065* (2013.01); *B29C 47/8845* (2013.01); *B29C 2947/92009* (2013.01); *B29C 2947/92428* (2013.01); *B29K 2023/06* (2013.01); *B29K 2023/083* (2013.01); *B29K 2067/00* (2013.01); *B29K 2077/00* (2013.01); *B29K 2105/0026* (2013.01); *B29K 2105/0044* (2013.01); *B29K 2105/16* (2013.01); *C08K 3/0033* (2013.01)
USPC .......................................................... 427/359

(58) Field of Classification Search
CPC ........... B29C 47/8845; B29K 2023/06; B29K 2067/00; C08K 3/0033; C09D 123/06
USPC ............... 427/359, 365, 398.2; 428/513, 523; 524/427
See application file for complete search history.

(56) References Cited

U.S. PATENT DOCUMENTS

| 4,957,578 A | 9/1990 | Huffman et al. |
| 5,387,630 A | 2/1995 | Edwards et al. |

(Continued)

FOREIGN PATENT DOCUMENTS

| EP | 2077296 | 7/2009 |
| EP | 2077296 A1 * | 7/2009 |
| WO | 2008037844 | 4/2008 |

OTHER PUBLICATIONS

International Search Report for PCT App. No. PCT/US2010/058204 mailed on Feb. 25, 2011.

*Primary Examiner* — Alexander Weddle
(74) *Attorney, Agent, or Firm* — Whyte Hirschboeck Dudek S.C.

(57) ABSTRACT

Methods for extrusion coating a substrate are provided. The methods comprise applying an extrusion coating composition to a surface of a substrate by extrusion coating. In these methods, the extrusion coating composition includes a polyolefin and an inorganic particulate material having an average particle size of no greater than 2 μm and a particle loading of at least 20 weight percent, based on the total weight of polyolefin and the inorganic particulate material.

11 Claims, 1 Drawing Sheet

(51) Int. Cl.
  *C09D 123/04* (2006.01)
  *C09D 123/06* (2006.01)
  *B29C 47/00* (2006.01)
  *B29C 47/02* (2006.01)
  *B29C 47/88* (2006.01)
  *B29C 47/06* (2006.01)
  *B29K 67/00* (2006.01)
  *B29K 77/00* (2006.01)
  *B29K 105/00* (2006.01)
  *B29K 105/16* (2006.01)
  *C08K 3/00* (2006.01)

(56) References Cited

U.S. PATENT DOCUMENTS

| | | | |
|---|---|---|---|
| 5,395,471 A * | 3/1995 | Obijeski et al. | 156/244.11 |
| 5,512,370 A * | 4/1996 | Edwards et al. | 428/373 |
| 6,521,338 B1 | 2/2003 | Maka | |
| 2004/0079467 A1 | 4/2004 | Brumbelow et al. | |
| 2006/0219980 A1 * | 10/2006 | Onoyama et al. | 252/500 |
| 2007/0087212 A1 | 4/2007 | Iyengar et al. | |
| 2008/0097022 A1 | 4/2008 | Laiho et al. | |

* cited by examiner

NOISE-REDUCING EXTRUSION COATING COMPOSITIONS

CROSS REFERENCE TO RELATED APPLICATIONS

This application is a national stage entry of International Application No. PCT/US10/58204, filed 29 Nov. 2010, which claims priority from U.S. provisional application No. 61/290,580, filed 29 Dec. 2009, both of which are incorporated herein by reference.

BACKGROUND

The extrusion coating process can be described as the application of a molten polymeric web onto a moving substrate at high melt temperatures and generally high speeds of up to over 700 meters per minute (mpm). Extrusion coating aimed at producing high gloss surface finishes for decorative purposes create a lot of noise in the area around the laminator, which often requires additional precautions for a safe operating environment in terms of common industrial hygiene standards. The noise represents an indicator for process related limitations, which are becoming more accentuated with increasing line speeds. However, high line speeds are desirable because they enable economically attractive operation of extrusion coating equipment. Therefore, it would be helpful to have a robust extrusion coating process free of edge over-coating problems (i.e., sticking to the pressure or chill roll) that lead to process disruptions, including loss of over-coating and destruction of polymer adhesion.

SUMMARY

One aspect of the invention provides methods for extrusion coating a substrate, the methods comprising applying an extrusion coating composition to a surface of the substrate by extrusion coating, whereby the extrusion coating composition contacts a chill roll surface. In the methods, the extrusion coating composition comprises a polyolefin and an inorganic particulate material having an average particle size of no greater than 2 μm and a particle loading of at least 20 weight percent, based on the total weight of the polyolefin and the inorganic particulate material in the coating composition. In some embodiments of the methods, the polyolefin comprises a polyethylene or polyethylene interpolymer having a density of no greater than 940 g/cc.

In some embodiments of the methods, the extrusion coating compositions is characterized in that it reduces the extrusion coating noise level at the chill roll release point by at least 3 dB relative to an identical extrusion coating process conducted with the same extrusion coating composition absent the inorganic particulate material. For the purposes of this disclosure, noise reduction is measured for a polyolefin extrusion coatings composition applied on a chrome-plated glossy chill roll with a surface roughness of 0.5 μm, at an extrudate temperature at the die of 320° C. and an air gap of 250 mm at a coating weight of 25 (g/m²) and a line speed of 300 mpm or at a coating weight of 12 g/m² at a line speed of 500 mpm. In some embodiments the extrusion coating compositions is characterized in that it reduces the extrusion coating noise level at the chill roll release point by at least 10 dB. The extrudate temperature can be measured using an infrared radiation thermometer focused on the extrudate just as it leaves die.

In some embodiments of the methods, the inorganic particulate material has an average particle size of no greater than 1.5 μm and a particle loading of at least 30 weight percent, based on the total weight of the polyolefin and the inorganic particulate material in the coating composition. The inorganic particulate material can be calcium carbonate.

Another aspect of the invention provides coated substrates comprising a substrate and a coating composition coated on a surface of the substrate, the coating composition comprising a polyolefin and an inorganic particulate material having an average particle size of no greater than 2 μm and a particle loading of at least 20 weight percent, based on the total weight of the polyolefin and the inorganic particulate material.

In some embodiments, the substrate comprises a paper product.

In some embodiments, the inorganic particulate material has an average particle size of no greater than 1.5 μm and a particle loading of at least 25 weight percent, based on the total weight of the polyolefin and the inorganic particulate material.

In some embodiments, the polyolefin comprises a polyethylene or polyethylene interpolymer has a density of no greater than 940 g/cc and the inorganic particulate material comprises a mineral.

DETAILED DESCRIPTION OF THE PREFERRED EMBODIMENT

Figure 1A:
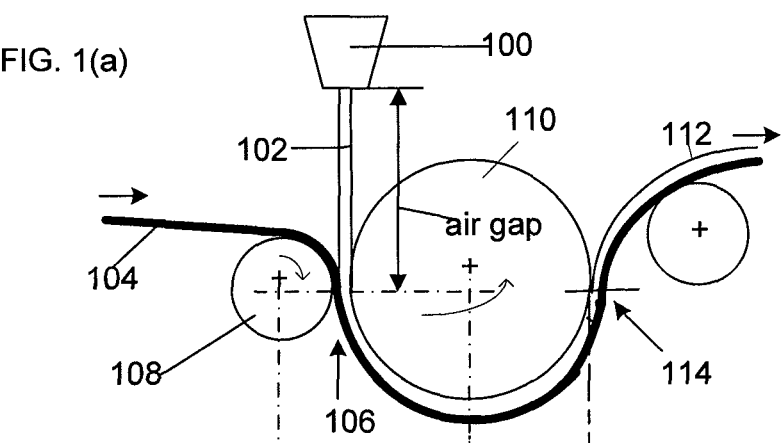
FIG. 1(a) is a schematic illustration of a side-view of a system for extrusion coating a substrate.

The inventors have unexpectedly discovered that by adding an inorganic particulate material having an appropriate particle size distribution at an appropriate loading to a polyolefin in an extrusion coating composition, excellent chill roll release, and therefore substantially reduced noise, can be achieved without degrading the adhesion between the extrusion coating and the coated substrate.

As such, one aspect of the invention provides methods for extrusion coating a substrate, the methods comprising applying an extrusion coating composition to a surface of a substrate by extrusion coating. In these methods, the extrusion coating composition includes a polyolefin and an inorganic particulate material having an average particle size of no greater than 2 μm and a particle loading of at least 20 weight percent, based on the total weight of the polyolefin and the inorganic particulate material.

Without intending to be bound to any particular theory of the invention, it is believed that a particulate material having the appropriate particle size distribution and loading provides an extrusion coating with a sufficient number of inorganic particles at the interface of the extrusion coating and the chill roll surface during the extrusion process to substantially reducing the sticking of the extrusion coating to the chill roll, without degrading the adhesion between the extrusion coating and the coated substrate.

Polyolefins:

The extrusion coatings include at least one polyolefin. "Polyolefin", "PO" and like terms mean a polymer derived from simple olefins. Representative polyolefins include polyethylene, polypropylene, polybutene, polyisoprene and their various interpolymers. The present methods are particularly well-suited for use with extrusion coatings that include polyolefins, such as polyethylene of lower densities and interpolymers (e.g., copolymers) thereof, because such polyolefins are known to experience substantial tackiness on chill rolls during extrusion coating and, therefore, to produce a lot of noise.

The polyolefins can be, for example, low density polyethylene (LDPE), polypropylene (PP), high density polyethylene (HDPE) and other polyolefins of lower densities such as enhanced polyethylene (EPE), polyolefin plastomers (POPs), polyolefin elastomers (POEs), polypropylene based plastomers (PBP) and polyolefin block elastomers (PBEs), such as olefin block copolymers (OBCs). Suitable polyolefins of lower densities include ultra low linear density polyethylenes (VLDPEs), including metallocene polyethylenes and polyethylene copolymers. The comonomers that are useful in the preparation of polyethylene copolymers include alpha-olefins, such as $C_3$-$C_{20}$ alpha-olefins (e.g., $C_4$-$C_{10}$ alpha-olefins). The alpha-olefin comonomers can be linear or branched, and two or more comonomers can be used, if desired. Examples of polyethylene copolymers include ethylene acrylic acid (EAA) copolymers, ionomers, ethylene methyl acrylic acid (EMAA) copolymers, ethylene ethyl acrylate (EEA) copolymers, ethylene methyl acrylate (EMA) copolymers, ethylene butyl acrylate (EBA) copolymers, and ethylene vinyl acetate (EVA) copolymers.

The polyolefins used generally have a density of no greater than about 0.940 g/cc. This includes embodiments in which the polyolefin is a polyethylene having a density of about 0.916 g/cc to about 0.940 g/cc and further includes embodiments in which the polyethylene has a density below 0.916 g/cc (e.g., from about 0.860 g/cc to about 0.915 g/cc). In some embodiments the polyolefins, including polyethylene and/or polypropylene, have a density of from about 0.860 g/cc to about 0.905 g/cc. This includes embodiments in which the polyethylene and/or polypropylene have a density of from about 0.860 g/cc to less than 0.890 g/cc. For the purposes of this disclosure, densities are measured in accordance with ASTM D-1505.

The present extrusion coating compositions typically have a polyolefin content of up to about 80 weight percent (wt. %), based on the total weight of the polyolefin and the inorganic particulate material in the extrusion coating composition. This includes embodiments in which the extrusion coating compositions have a polyolefin content of up to about 75 wt. %, based on the total weight of the polyolefin and the inorganic particulate material in the extrusion coating composition.

Inorganic Particulate Material:

The inorganic particulate material can take the form of a wide variety of materials, provided that it has the noise-reduction capabilities described herein. Generally, any minerals that can be ground to a fine particle size less than the thickness of the coatings and is stable during the extrusion coating process without interaction with the polymer can be used. In some embodiments, the particulate material comprises a mineral, such as calcium carbonate.

The particles in the inorganic particulate material have an average particle size (d50) of no greater than about 2 μm. In some embodiments, the particles of the particulate material have and average particle size of no greater than about 1.5 μm. The particles sizes presented in this disclosure are measured using light scattering on an ashed material.

The inorganic particulate matter is present at a loading of at least 20 wt. %, (e.g., about 20 to about 60 wt. %), based on the total weight of the polyolefin and the inorganic particulate material in the extrusion coating composition. This includes embodiments in which the inorganic particulate matter is present at a loading of at least 25 wt. %, based on the total weight of the polyolefin and the inorganic particulate material in the extrusion coating composition.

Multilayered Coatings and Pre-Treatments:

In some embodiments, the extrusion coating compositions are co-extruded with one or more optional, additional extrusion compositions to provide a multilayered, extrusion coated substrate, provided that the present extrusion coating compositions are co-extruded as the outer layer in contact with the chill roll. Alternatively, the additional layers of a multilayered coated can be produced by an extrusion lamination process. Examples of polymeric materials that can be co-extruded or laminated to provide a multilayered extrusion coating include, polyolefins, polyamides and polyesters.

In order to enhance the bonding of the extrusion coating to the underlying substrate or the various layers of a multilayered coating to each other, the coating layers and/or substrate may be pretreated. For example, extrusion coating and extrusion lamination processes can use corona treatment, flame retardant or plasma treatment of the substrates or lamination webs or ozone treatment of the molten extrusion coating composition to enhance interlayer adhesion.

Optional Components:

In addition to the polyolefin and the inorganic particulate material, the extrusion coating compositions can include other additives, such as those typically found in extrusion coating compositions. These include, for example, stabilizers, flame retardants, fillers, slip and antiblock agents, and the like. When present, such additives typically account from less than about 2 wt. % of the extrusion coating composition. In some embodiments, the extrusion coating compositions are free of particulate fillers, other than the above-described noise-reducing inorganic particulate fillers.

Substrates:

Substrates that can be extrusion coated using the present methods include papers, paperboards, polymeric films, metal foils, metalized polymeric films, $SiO_x$ coated films, woven and non woven fibers or tapes and the like. In some embodiments, the inorganic particulate material in the coating result in enhanced adhesion to the substrate compared to an equivalent coating which does not include the inorganic particulate material. This enhancement can be measured, for example, using a peel test.

Extrusion Coating:

A schematic illustration of a system for extrusion coating is provided in FIGS. 1(a) and (b). In its basic embodiment, extrusion coating is a process in which an extrusion coating composition is extruded from a die 100 as a molten web 102 onto a moving substrate 104 which is subsequently passed through a nip 106 defined by a pressure roller 108 and a chilled roller ("chill roll") 110, which cools the molten web into a solid polymeric coating 112 on the substrate.

In the extrusion coating process, as the polymeric coating is pulled from the chill roll, the noise intensity (chatter) generated at the release point 114 is an indication of chill roll release. The lower the noise level, the better the chill roll release.

In the present methods the extrusion coating compositions that are extrusion coated onto a substrate provide a noise level at the chill roll release point that is significantly reduced relative to that for an identical method and extrusion coating composition in the absence of the inorganic particulate material. In some embodiments, the noise level at the chill roll release point is reduced by at least 3 decibels (dB) relative to that for an identical method and extrusion coating composition in the absence of the inorganic particulate material. This includes embodiments in which the noise level at the chill roll release point is reduced by at least 5 dB, at least 10 dB, or even at least 15 dB, relative to that for an identical method and extrusion coating composition in the absence of the inorganic particulate material.

Although the noise level of the extrusion coating process can depend on the type of chill roll surface and material of construction, the present coating compositions and methods can be used to achieve a noise reduction on a variety of different chill roll surfaces, including glossy, matte, and embossed chill rolls made with different surface plating materials such as chromed and the like.

Example

This example illustrates one embodiment of a method of extrusion coating a filled polyolefin composition onto a Kraft paper substrate.

The reduction in noise at the chill roll release point can depend on the surface roughness of the chill roll and the line speed. Thus, for the purposes of this disclosure and these examples, noise reduction is measured for 25 g/m² coatings at 300 mpm line speed and 12 g/m² coatings at 500 mpm line speed onto Kraft paper against a glossy chrome plated chill roll with a surface roughness RT equal to 0.3 to 0.5 microns. In making the comparison between the noise level produced by the present extrusion coating compositions and a comparative extrusion coating composition that does not include the noise-reducing inorganic particulate matter, all other extrusion coating parameters that affect the noise level at the chill roll release point are kept the same during the testing of both samples.

The extrusion coating compositions are prepared, for example, by dry blending a particle-filled compound (i.e., a master batch, MB) and the polyolefins. Filled compounds include a high loading of the inorganic particulate material in a carrier resin. The filled compounds are produced through a compounding extruder, compounding on a milling roll or in a Banbury mixer, or by any other suitable method whereby the filler and the carrier resin can be blended together to create a homogeneous dispersion suitable for use in the extrusion coating compositions. The characteristics of each filled compound are listed in Table 1.

TABLE 1

Master Batches

| Compound Name | Carrier Resin | Filler Type | Particle size distribution d50 | Filler Loading wt. % | Compound density g/cc |
|---|---|---|---|---|---|
| MB1 | LDPE PG7008 | CaCO₃ | 1.6 | 70 | 1.706 |
| MB2 | LDPE PG7008 | CaCO₃ | 1.3 | 70 | 1.706 |
| Comparative | Borealis CA8200 | Talc | 6.5 | 30 | 1.15 |

Two working master batches (MB1 and MB2) are prepared for use in the extrusion coating compositions of this example. Two types of calcium carbonate mineral filler from Imerys are used in the master batches. The fillers used are surface modified ultra-fine wet marble sold under the trademark Supercoat®. The difference between the two calcium carbonates tested is the particle size distribution. A comparative filled compound from Borealis is also tested. Borealis CA8200 is a talc filled compound.

Examples of suitable polyolefins used in the extrusion coating compositions are shown in Table 2 and the formulations for inventive and comparative extrusion coating compositions are shown in Table 3.

TABLE 2

| Polymer | Sold As: | Polymer Type | Melt flow index (g/10 min @ 190° C., 2.16 kg) ASTM 1238-04 | Density (g/cc) ASTM D792-00 |
|---|---|---|---|---|
| PE | LDPE PG 7004 | Polyethylene Homopolymer | 4.1 | 0.9215 |
| POP | AFFINITY™ PT1451G1 | Polyethylene Plastomer | 7.5 | 0.9020 |
| EPE1 | ELITE™ 5800G | Enhanced polyethylene | 12 | 0.911 |
| EPE2 | ELITE™ 5810G | Enhanced polyethylene | 8 | 0.918 |

For the purposes of this disclosure, extrusion coatings are processed on an extrusion coating line (e.g., a Davis Standard (Erwepa) coating line) onto a chrome plated glossy chill roll having a diameter of 900 mm, a surface roughness (RT) equal to 0.3 to 0.5 microns. The extrusion coating processing conditions are as follows. The set melt temperature for the extrusion coatings is 320° C. The air gap is 250 mm and the nip off-set is 15 mm toward the pressure roll. The line speeds for the extrusion coatings are 300 mpm for 25 g/m² coatings and 500 mpm for 12 g/m² coatings.

Figure 1B:
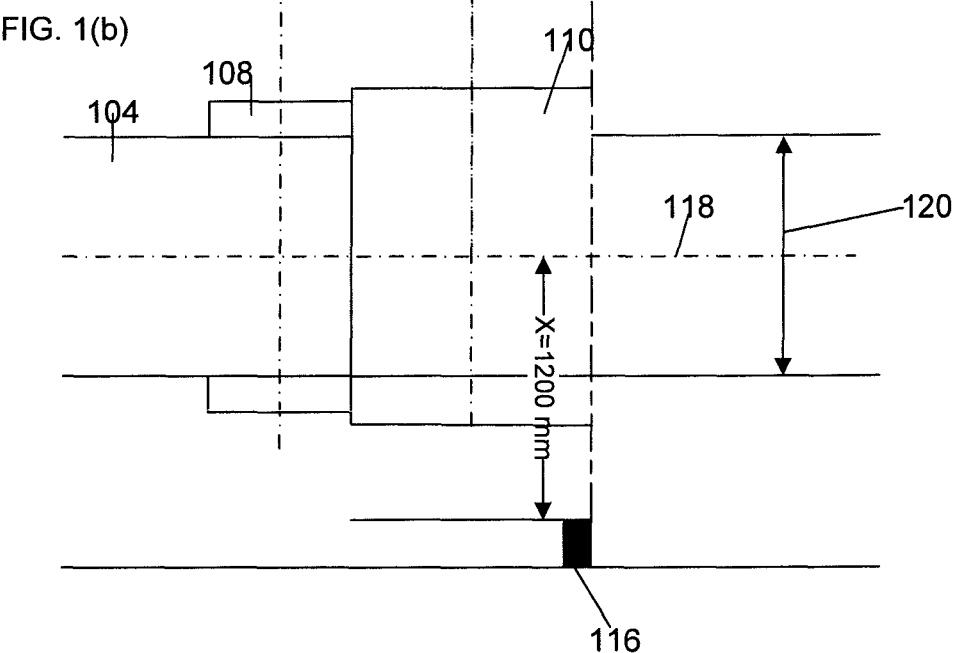
FIG. 1(b) is a schematic illustration of the top view of the system of FIG. 1(a).

Noise measurements were made using a Realistic™ sound level decibel meter (Tandy Corp.) at a defined position, representing the work environment for operators standing next to the laminator during processing. The set-up for measuring the noise of the extrusion coating process is shown in FIG. 1(b). The meter 116 is adjacent the release point from the chill roll and pointed directly at the source of the noise defined by the chill roll release point. For the purposes of measuring the noise and evaluating any noise reductions, the distance between the noise meter 116 and the centerline 118 of the substrate width 120 (shown as an 'x' in FIG. 1(b)) is 1200 mm. Measurements are preformed under weighting selector 'A' responding to a frequency range from 500 to 10,000 Hz. The results of the noise measurements are provided in Table 3.

TABLE 3

Noise levels at the chill roll release point in dB.

| Extrusion Coatings (Extrusion Temperature; Coating weight in g/m² (gsm); Line Speed in mpm) | Extrusion Coatings (320° C.; 25; 300) | Extrusion Coatings (320° C.; 12; 500) |
|---|---|---|
| PE | 96 | 96 |
| Borealis CC7290 | 88 | 91 |
| POP | 96 | 100 |
| EPE1 | 99 | 93 |
| EPE2 | 91 | 94 |
| 60% POP + 40% MB1 | 81 | 92 |
| 60% EPE1 + 40% MB1 | 82 | 90 |
| 60% EPE2 + 40% MB1 | 80 | 87 |
| 60% EPE2 + 40% MB2 | 79 | 86 |

(A reduction by 3 dB equals a noise reduction of 50%. The percentages represent weight percent of the master batch in the extrusion coating compositions, based on the total weight of the master batch and the polyolefin.)

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

Numerical ranges include all values from and including the lower and the upper values, in increments of one unit, provided that there is a separation of at least two units between any lower value and any higher value. As an example, if a compositional, physical or other property is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

DEFINITIONS

"Polymer" means a polymeric compound prepared by polymerizing monomers, whether of the same or a different type. The generic term polymer thus embraces the term homopolymer, usually employed to refer to polymers prepared from only one type of monomer, and also embraces the term interpolymer. "Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Composition", "formulation" and like terms means a mixture or blend of two or more components.

The term "comprising" and its derivatives are not intended to exclude the presence of any additional component, step or procedure, whether or not the same is specifically disclosed. In order to avoid any doubt, any process or composition claimed through use of the term "comprising" may include any additional steps, equipment, additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination. In the embodiments of this invention described herein, those embodiments described as "comprising" or "including" certain components, steps, elements, etc. can be converted into additional examples by replacing the term "comprising" or "including" with the phrases "consisting of" or "consisting essentially of".

Although the invention has been described in considerable detail through the preceding description, drawings and examples, this detail is for the purpose of illustration. One skilled in the art can make many variations and modifications without departing from the spirit and scope of the invention as described in the appended claims.

What is claimed is:

1. A method for extrusion coating a substrate, the method comprising applying an extrusion coating composition to a surface of the substrate by extrusion coating, whereby the extrusion coating composition contacts a chill roll surface, the extrusion coating composition consisting essentially of:
    (a) one or more ethylene-based polymers selected from the group consisting of polyethylene homopolymers and polyethylene copolymers prepared from only two different monomers, the ethylene-based polymers having a density no greater than 0.940 g/cc; and
    (b) an inorganic particulate material having an average particle size of no greater than 1.5 µm and a particle loading of at least 25 weight percent, based on the total weight of the polyolefin and inorganic particulate material in the coating composition,
    wherein the extrusion coating composition is characterized in that it reduces the extrusion coating noise level at the chill roll release point by at least 3 dB relative to an identical extrusion coating process conducted with the same extrusion coating composition absent the inorganic particulate material, wherein the noise level at the chill release point is measured using a chrome-plated gloss chill roll with a surface roughness of 0.5 µm at an extrudate temperature of 320° C. and an air gap of 250 mm for an extrusion coating of 25 g/m² applied at a line speed of 300 mpm or an extrusion coating of 12 g/m² applied at a line speed of 500 mpm.

2. The method of claim 1, wherein the extrusion coating composition is characterized in that it reduces the extrusion coating noise level at the chill roll release point by at least 5 dB relative to an identical extrusion coating process conducted with the same extrusion coating composition absent the inorganic particulate material, wherein the noise level at the chill roll release point is measured using a chrome-plated glossy chill roll with a surface roughness of 0.5 µm, at an extrudate temperature of 320° C. and an air gap of 250 mm for an extrusion coating of 25 g/m² applied at a line speed of 300 mpm or an extrusion coating of 12 g/m² applied at a line speed of 500 mpm.

3. The method of claim 2, wherein the extrusion coating composition is characterized in that it reduces the extrusion coating noise level at the chill roll release point by at least 10 dB.

4. The method of claim 1, wherein the inorganic particulate material has a particle loading of at least 30 weight percent, based on the total weight of the polyolefin and the inorganic particulate material in the coating composition.

5. The method of claim 1, wherein the inorganic particulate material is calcium carbonate.

6. The method of claim 1, further comprising extruding one or more additional extrusion coating layers between the substrate and the extrusion coating composition to provide a multilayered, extrusion coated substrate, in which the extrusion coating composition is in contact with the chill roll.

7. The method of claim 1, wherein at least one of the ethylene-based polymers has a density of less than 0.916 g/cc.

8. The method of claim 1, wherein at least one of the ethylene-based polymers has a density of from about 0.860 g/cc to about 0.905 g/cc.

9. The method of claim 1, wherein at least one of the ethylene-based polymers has a density of from 0.860 g/cc to less than 0.890 g/cc.

10. The method of claim 1, wherein the ethylene-based polymers are selected from the group consisting of low density polyethylene (LDPE), high density polyethylene (HDPE), enhanced polyethylene (EPE), ultra low linear density polyethylene (VLDPE), ethylene acrylic acid (EAA) copolymers, ionomers, ethylene methyl acrylic acid (EMAA) copolymers, ethylene ethyl acrylate (EEA) copolymers, ethylene methyl acrylate (EMA) copolymers, ethylene butyl acrylate (EBA) copolymers, ethylene vinyl acetate (EVA) copolymers, and combinations thereof.

11. The method of claim 1, wherein the ethylene-based polymers are selected from the group consisting of LDPE, EPE and combinations thereof.

* * * * *